United States Patent [19]

Edakubo et al.

[11] Patent Number: 4,486,792
[45] Date of Patent: Dec. 4, 1984

[54] MAGNETIC RECORDING AND REPRODUCING DEVICE

[75] Inventors: Hiroo Edakubo, Tokyo; Masaya Maeda, Kanagawa, both of Japan

[73] Assignee: Canon Kabushiki Kaisha, Tokyo, Japan

[21] Appl. No.: 333,477

[22] Filed: Dec. 22, 1981

[30] Foreign Application Priority Data

Dec. 27, 1980 [JP] Japan ................................ 55-186512

[51] Int. Cl.³ ...................... H04N 5/783; G11B 21/10
[52] U.S. Cl. .................................. 360/10.2; 360/10.3; 360/64; 360/77
[58] Field of Search ........................ 360/10.2, 10.3, 61, 360/64, 21, 7, 11.1, 70, 75, 77, DIG. 1; 358/312

[56] References Cited

U.S. PATENT DOCUMENTS

| 3,888,385 | 6/1975 | Loughry | 360/11.1 |
| 3,964,094 | 6/1976 | Hart | 360/70 |
| 4,165,523 | 8/1979 | Hathaway | 360/DIG. 1 |
| 4,203,140 | 5/1980 | Watanabe | 360/70 |
| 4,229,773 | 10/1980 | Sakamoto | 360/77 |
| 4,318,146 | 3/1982 | Ike | 360/21 |
| 4,328,518 | 5/1982 | Kawata | 360/64 |

FOREIGN PATENT DOCUMENTS 55-22284 2/1980 Japan ................................. 360/10.2

Primary Examiner—Alan Faber
Attorney, Agent, or Firm—Toren, McGeady and Stanger

[57] ABSTRACT

A magnetic recording and reproducing device includes a reproducing mechanism which can be operated in a selected one of a first mode wherein information recorded on a tape is reproduced at a speed substantially equal to that at which the information was recorded, and a second mode wherein the information is reproduced at a speed different from that at which it was recorded. The reproducing mechanism includes a principal rotation head which produces an information signal in the first mode. The mechanism also includes an auxiliary rotation head which operates to detect the positional shift of the principal head relative to the tape when the first mode is selected, and reproduces the information recorded on the tape when the second mode is selected.

22 Claims, 7 Drawing Figures

MAGNETIC RECORDING AND REPRODUCING DEVICE

BACKGROUND OF THE INVENTION

1. Field of the Invention:

The present invention relates to a magnetic recording and reproducing device, and particularly to a helical scan type magnetic recording and reproducing device capable of still and slow motion reproduction.

2. Description of the Prior Art:

In a video tape recorder (VTR) for recording and reproducing an image on and from a magnetic tape helically wound on a rotation head, an azimuth recording system in adopted in order to make high density recording possible. By means of a pair of rotation heads with different inclination angles, an azimuth track is formed on the tape in order to eliminate the cross stroke interference due to tracing the adjacent track, and to realize a high density recording in a narrow recording track.

Further, an azimuth recording type helical VTR arranged so that in addition to the principal rotation head for image reproduction, a double azimuth head is provided on the rotation head, has been proposed. In case of such a two-head-type helical VTR, the principal rotation head is used for ordinary reproduction, while the double azimuth head is used for still or slow motion reproduction. FIG. 1 shows the outline of the arrangement of the rotation heads of such a device. As is shown in the drawing, the rotation head Ha is the one having the plus azimuth, Hb is the one having the minus azimuth, and an auxiliary head having a plus azimuth and carrying out the still and the slow motion reproduction is provided at the side of the head Hb. Accordingly, in case of the ordinary image reproduction, the plus azimuth head Ha and the minus azimuth head Hb trace the azimuth recording adjacent track on the tape to pick up the image signal. Further, in case of still reproduction, the auxiliary plus azimuth head at the side of head Hb traces the same track that the plus azimuth head Ha has traced so as to reproduce the still image signal from the tape of 1 track, 1 field recording. Thus, a clear still image even of a scene with quick motion can be reproduced. In case of the above-mentioned conventional device, the auxiliary heads are used only for still and slow motion reproduction, so that the utilization of the auxiliary heads is low and therefore the cost of the device is high, which is not economical.

It is a recent trend that in order to realize high density recording and reproducing on and from a magnetic recording medium, the track pitch is narrowed, so that a more correct tracking system in which magnetic heads trace the track must be developed. For this purpose, an automatic scan tracking device making use of a bimorph plate consisting of piezo elements as the head support arm, is under consideration. For example, U.S. Pat. No. 4,203,140 discloses a device arranged so that one or more auxiliary heads are provided in the head construction in such a manner that automatic tracking is carried out with the displacement of the piezo element due to the outputs of the heads. The auxiliary heads used for such a device are used for reproduction of a control pilot signal or for the detection of the envelope of the image signal, and not for the reproduction of the image signal.

SUMMARY OF THE INVENTION

It is an object of the present invention to eliminate the above-mentioned shortcomings of the conventional system by offering a magnetic recording and reproducing device arranged so that more correct tracking control is carried out by means of auxiliary heads, when reproduction occurs at a speed different from that at the time of recording.

It is another object of the present invention to offer a magnetic recording and reproducing device by means of which the quality of the picture at the time of a special reproduction rate such as a still picture reproduction (hereinafter called "still reproduction"), a slow motion reproduction (hereinafter called "slow reproduction") and the like is substantially improved.

Other objects of the present invention will be obvious in view of the explanation given below.

DESCRIPTION OF THE PREFERRED EMBODIMENTS

Figure 2:
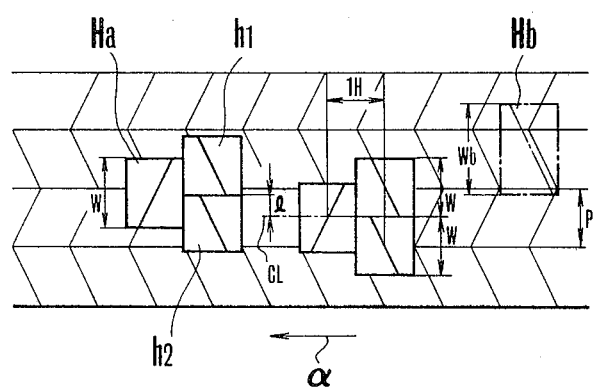
FIG. 2 shows the arrangement of the heads and the track of an embodiment of a magnetic recording and reproducing device according to the invention.

Below, an application of an embodiment of the present invention to a helical scan type video tape recorder will be explained. FIG. 2 shows the construction of the magnetic head of the above application, and the recording track. The drawing shows a magnetic tape T, a drum DRM for guiding the tape, a capstan roller CAP cooperating with a pinch roller PIN for guiding the tape T along the direction of arrow B, a guide pin GD for the tape, a principal head Ha having the plus azimuth and carrying out the recording and the ordinary reproduction, and auxiliary heads h1 and h2 having the minus azimuth and carrying out the detection of the tracking error and the slow reproduction of the image, or the reproduction of the still image. Arrow A indicates rotation direction of the head, while arrow α indicates the running direction of the head. Now, let us suppose that the width W of the principal head Ha is larger than that of the track pitch P, and the width w of the auxiliary heads h1 and h2 are almost equal to the track pitch P, respectively, Further, the boundary line between the two auxiliary heads is aligned with the center line of the principal head as extended along the running direction α of the principal head. Now let us suppose that the distance between the center of the principal head Ha and that of the auxiliary head h1 for carrying out the slow reproduction and the still image reproduction along the running direction of the head, is a certain determined value during a horizontal scanning time (hereinafter called 1H). In the present embodiment, it is set for 1H. Further, let us suppose that the distance between the auxiliary heads h1 and h2 along the running direction of the head be also a certain determined one for a horizontal scanning time, wherein for the present embodiment it is set at 0H. Further, let us suppose that the principal head Ha and the auxiliary heads h1 and h2 are secured on a vibration base plate (not shown) consisting of bimorph vibrators making use of the piezo element with the above-mentioned positional relation. Further, there are two heads Hb having the minus azimuth, namely the one which has the same auxiliary head as that of the plus azimuth head Ha and the other which consists of a single rotation head. For the sake of simplicity let us suppose that the head be the single rotation head Hb. The width Wb in the vertical direction with respect to the running direction of the head Hb, is wider than the track width.

Figure 3:
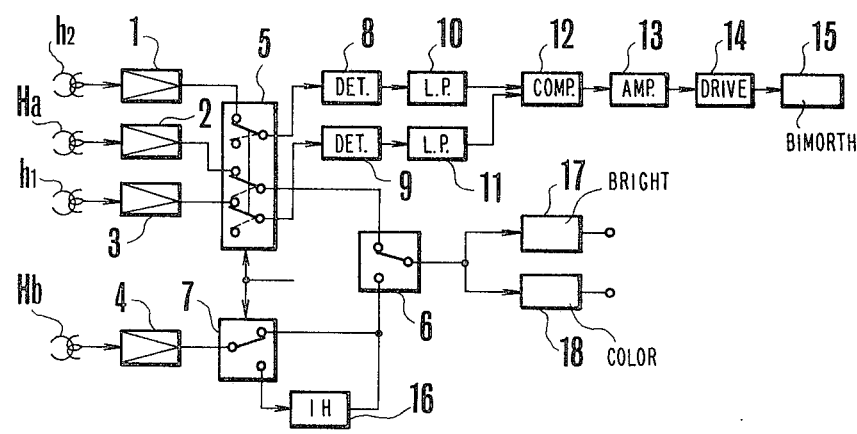
FIG. 3 shows a block diagram of an example of a reproducing circuit for the embodiment shown in FIG. 2.

FIG. 3 shows the block diagram of the circuit of the above-mentioned embodiment, at the time of reproduction. The principal rotation heads Ha, Hb and the auxiliary heads h1 and h2 are arranged so as to assume the above-mentioned positional relation. Amplifiers 1, 2, 3 and 4 are provided for amplifying the reproduced outputs of the heads h2, Ha, h1 and Hb up to the proper level. Switches 5 and 7 are arranged to be changed over with selection of the reproduction mode. Also shown are the amplitude detectors 8 and 9 of the auxiliary heads, low pass filters 10 and 11 for obtaining DC, a comparator 12, a driving amplifier 13, a bimorph driving circuit 14, a bimorph 15 for electrical-mechanical conversion, a 1H delay circuit 16 for the time compensation, a change over switch 6 for changing over the head to be used, a reproduction processing circuit 17 for a brightness signal, and a color signal reproduction processing circuit 18.

When the magnetic tape recorded in azimuth is reproduced at the same speed as that at the time of recording, the outputs of the principal heads Ha and Hb are led to the amplifiers 2 and 4 in the same way as in the conventional VTR, so as to be amplified up to a proper level, and then to the change over switch 6 through the switch circuits 5 and 7 to be changed over with selection of the reproduction mode, so as to be converted into the reproduction image signal through the reproduction processing circuits 17 and 18. The outputs of the auxiliary heads h1 and h2 are lead to the amplifiers 3 and 1 so as to be amplified up to a proper level, then to the amplitude detectors 9 and 8 through the switch circuit 5 so as to be detected, and to the low pass filters 11 and 10 so as to be converted into DC proportional to the outputs of the auxiliary heads h1 and h2. Accordingly, the time constant of the low pass filters 11 and 10 is chosen comparatively short so as to be able to detect the variation of the outputs of the head with fidelity. As is shown in FIG. 2, the outputs of the auxiliary heads h1 and h2 are equal when the center of the principal head Ha is correctly aligned with that of the track, while when the center of the head Ha is displaced by l along the direction of the width of the track, the output of the auxiliary head at the side at which the principal head Ha is displaced is larger than that of the other auxiliary head. Therefore, by comparing the outputs of the auxiliary heads h1 and h2 by means of the comparator 12, the displacement on the track is obtained as the output difference, which is amplified with the amplifier 13 so as to move the bimorph 15 through the bimorph driving circuit 14 in such a manner that the difference of the outputs of the auxiliary heads is nullified, whereby the principal head Ha is so controlled as to correctly trace the track.

Namely, in case of the ordinary reproduction mode, the auxiliary heads h1 and h2 are used for the tracking of the signal reproducing heads Ha and Hb.

Then, in case of still reproduction, the switch circuits 5 and 7 are changed over in such a manner that their contact arms assume the positions shown by broken lines. Thus, the principal head Ha is uncoupled from the image signal reproducing system, and the output of the auxiliary head h1 is connected to the image signal reproducing processing circuits 17 and 18, so that the auxiliary head h1 is used for the image reproduction. However, because the auxiliary head h1 assumes, as is shown in FIG. 2, a position delayed by 1H with reference to the principal head Ha, there takes place a time difference between the output of the auxiliary head and that of the principal head Hb. Thus, the output of the principal head Hb is led to the 1H delay circuit 16 through the switch circuit 7 so as to be delayed by 1H. By means of such a construction, the output of the auxiliary head h1 is matched with that of the principal head Hb with reference to time, in such a manner that the image from the same track field can faithfully be reproduced by one frame. Further, in the case of slow reproduction, the still reproduction and the ordinary reproduction operations are alternatively carried out for every two tracks so as to carry out the slow reproduction operation without the noise bars. At the time of the slow and the still reproduction, the mistracking detecting system is disengaged, so that the bimorph is secured at the same position as at the time of recording.

Further, in the present embodiment, the 1H delay circuit is arranged at the side of the principal head Hb, whereby it goes without saying that it can be arranged at the output side of the auxiliary head. Further, the 1H delay circuit can consist either of the conventional drop out compensation circuit, or the 1H delay circuit for eliminating the cross talk of the color signal. Further, the positional relation between the track and the principal head is controlled, in case of the present embodiment, by means of the bimorph vibrators provided on the head mounting base plates, whereby the displacement of the tape along the direction of the drum axis or of the whole drum can also be taken into consideration.

Figure 4:
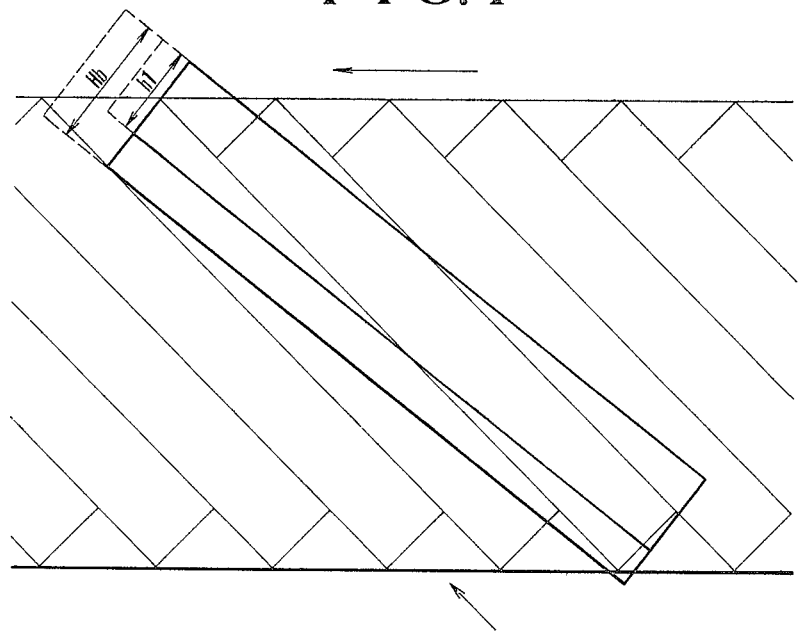
FIG. 4 shows the track and the head trace at the time of still reproduction, with the device shown in FIGS. 2 and 3.

FIG. 4 shows the scanning trace of the track and the principal head at the time of still reproduction in the above embodiment. Because, as is shown in the drawing, the principal head Hb and the auxiliary head h1 have the same azimuth, it is possible to carry out a "1 field still" free from the vibration of the quick image which is a shortcoming of the conventional "1 frame still". Further, because the wide head Hb, and the auxiliary head h1 whose track pitch P is shifted from that of the principal head Hb by ½, are made use of, the reproduction output is increased to more than that of the conventional device, while the S/N ratio is improved.

The above embodiment shown in FIGS. 2 and 3 is provided with two auxiliary heads, whereby many combinations of other numbers of the auxiliary heads with the positional relations between the principal heads and the auxiliary heads, can be thought of.

Figure 5:
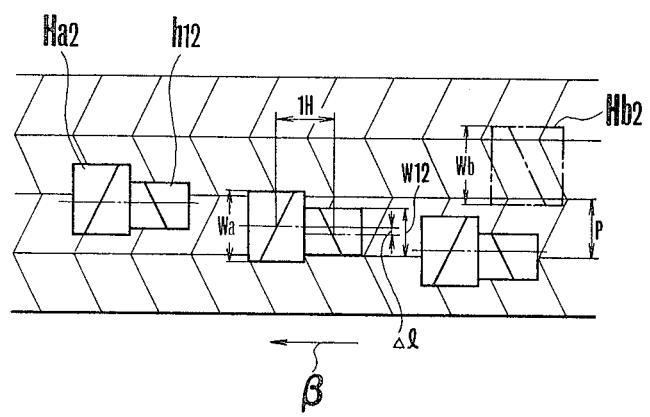
FIG. 5 shows an arrangement of the head and the track of another embodiment of the present invention.

FIG. 5 shows another embodiment of the construction of the heads in accordance with the present invention.

In the drawing, a principal head Ha2 has a plus azimuth and carries out the recording and the ordinary reproduction operations. An auxiliary head h12 has a minus azimuth. This head h12 is for detecting the mistracking and carrying out the still reproduction and the slow reproduction, whereby the arrow $\beta$ shows the running direction of the head. The width Wa of the principal head Ha2 is larger than the track pitch P. The width W12 of the auxiliary head h12 is narrower than the track pitch P, whereby the center line of the running direction of the principal head Ha2 is shifted from that of the auxiliary head h12 by $\Delta l$. $\Delta l$ is settled in such a manner that $Wa/2 > (W12/2) + \Delta l$. The distance along the running direction between the gap center of the principal head Ha2 and that of the auxiliary head h12 is a certain determined value for 1H. In case of the present embodiment, it is set for 1H. The heads Ha2 and h12 are secured on vibration plates (not shown) making use of the bimorph vibrators with the above-mentioned positional relation. There are two kinds of other heads having a minus azimuth and for carrying out recording, namely one whose construction is same as that of the above-mentioned plus azimuth head, and the other which consists of a conventional single rotation head. In the present embodiment, the single rotation head Hb2 is used. The width Wb of the head Hb2 is larger than the track pitch.

Figure 1:
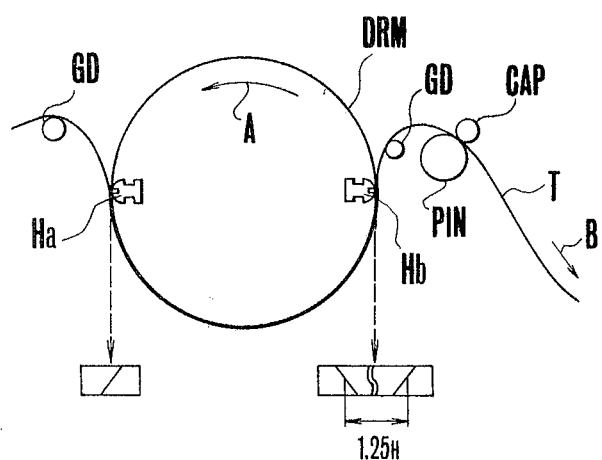
FIG. 1 shows a construction of a conventional two head helical magnetic recording and reproducing device including an auxiliary head.
Figure 6:
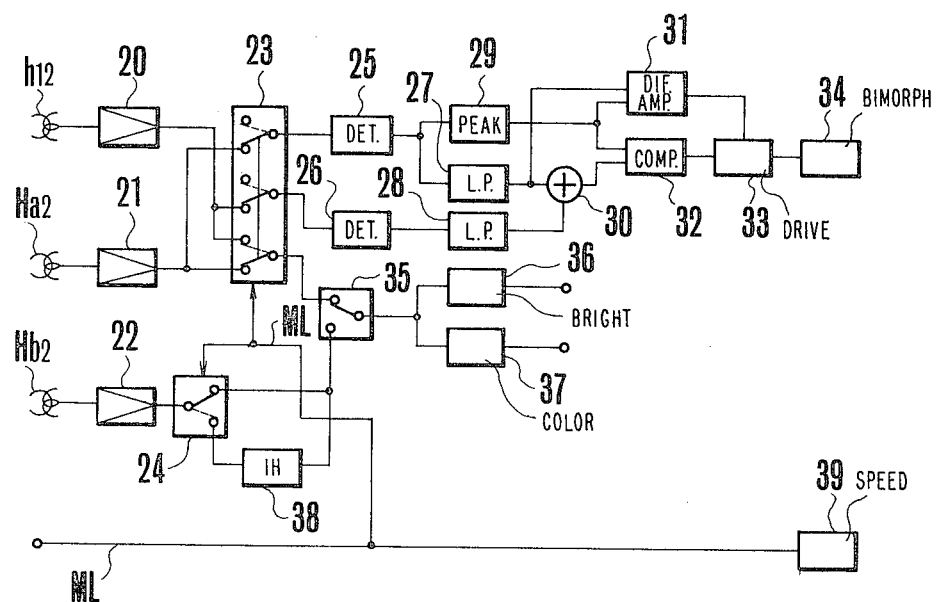
FIG. 6 shows a block diagram of an example of a reproducing circuit for the arrangement shown in FIG. 5.

FIG. 6 shows a block diagram of the reproduction circuit of the embodiment shown in FIG. 5. In the drawing, amplifiers 20, 21 and 22 are provided for amplifying the reproduction outputs of the heads h12, Ha2 and Hb2 up to a proper level, and switch circuits 23 and 24 are arranged to be changed over with the reproduction mode. Also shown are amplitude detecting circuits 25 and 26, low pass filters 27 and 28 for obtaining DC voltage, a peak hold circuit 29 for holding the peak of the reproduction output, an adder 30, a differential amplifier circuit 31, a comparator 32, a bimorph driving circuit 33, a bimorph vibrator 34, a change over switch 35 for changing over the head to be used, a brightness signal reproducing processing circuit 36, a color signal reproducing processing circuit 37, a 1H delay circuit 38 for time compensation, and a speed control circuit 39 for controlling the rotation speed of the capstan roller CAP (FIG. 1) by means of the signal from a reproduction mode control line ML.

When a magnetic tape recorded in azimuth by means of the circuit shown in the drawing is reproduced at the same speed as at the time of the recording, the outputs of the principal heads are led to the amplifiers 21 and 22 so as to be amplified up to proper level, and then to the change over switch 35 through the switch circuits 23 and 24 which are changed over by means of the signal on the reproduction mode control line ML, and to the brightness reproduction processing circuit 36 and the color reproduction processing circuit 37 so as to be converted into a reproduction image signal. Further, the output of the principal head Ha2 is led to the amplifier 21, then branched to the amplitude detecting circuit 25 so as to be detected, while the maximum value of the envelope is held by means of the peak hold circuit 29 for a comparatively long time. Further, the envelope detected by the detecting circuit 25 is converted into a DC voltage proportional to the output of the principal head Ha2. The output of the auxiliary head h12 is detected by the amplitude detector 26 and then converted by means of the low pass filter 28 into a DC voltage proportional to the output of the auxiliary head h12. The voltages proportional to the outputs of the principal head Ha2 and the auxiliary head h12 are added to each other in the adder circuit 30 and compared with the voltage whose peak is held in the comparator 31 so as to detect the direction of the tracking shift. Further, the voltage proportional to the output of the principal head Ha2 is led to the peak hold circuit 29 and the differential amplifier circuit 31 in order that voltage corresponding to the difference of the outputs is obtained so as to detect the shift amount. These signals control the bimorph driving circuit in such a manner that the principal head Ha2 traces the track correctly.

In the still reproduction mode, the switch circuits 23 and 24 are changed over to positions shown by broken lines, while the level of the signal on the control line ML becomes high and the speed control circuit 39 stops the transport of the tape T, whereby the principal head Ha2 is disconnected from the image signal reproducing processing circuit. On the other hand, the auxiliary head h12 is connected to the image signal reproducing processing circuit through the switch circuit 23 so as to be used for reproduction of the image signal. Further, the output of the auxiliary head h12 is uncoupled from the tracking control system, whereby the principal head Ha2 is fixed at the same position as at the time of recording. However, because the output of auxiliary head h12 is delayed relative to the principal head Ha2 by 1H, there takes place a time shift between the principal head Hb2 and the auxiliary head h12. Thus, the output of the principal head Hb2 is led to the 1H delay circuit 38 through the switch circuit 24 so as to be delayed by 1H. Thus, the output of the principal head Hb2 is matched with that of the auxiliary head h12 with reference to time, so that still reproduction from the same track becomes possible because the principal head Hb2 and the auxiliary head h12 have the same azimuth.

Figure 7:
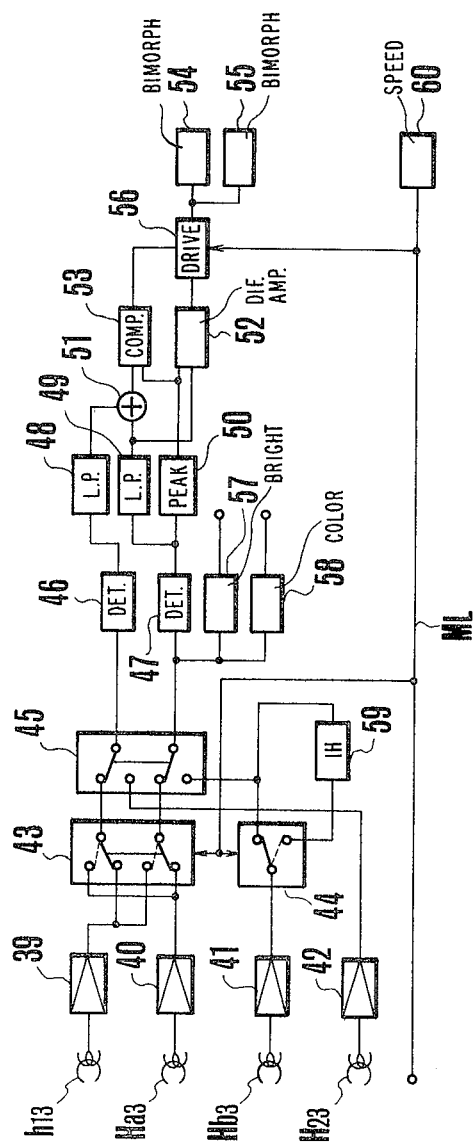
FIG. 7 shows a block diagram of another example of a reproducing circuit according to the invention.

FIG. 7 shows a block diagram of the reproduction circuit of another embodiment with the head construction shown in FIG. 5.

A principal head Ha3 has a plus azimuth and carries out the recording and the ordinary reproduction operations, and an auxiliary head h13 has a minus azimuth and carries out the detection of the mistracking and the still and slow reproduction operations. The auxiliary head h13 is mounted on the principal head Ha3 in the same way as is shown in FIG. 5. A principal head Hb3 has a minus azimuth and carries out the recording and the reproducing operations, and an auxiliary head h23 has a plus azimuth and carries out the detection of the mistracking. In the same way as in case of the heads h12 and Ha2 shown in FIG. 5, the auxiliary head h23 is mounted at a position delayed by 1H with reference to the principal head Ha3.

In the drawing, amplifiers 39, 40, 41 and 42 are provided for amplifying the reproduction output from the heads h13, Ha3, Hb3 and h23 up to proper level, and switch circuits 43 and 44 are arranged to be changed over between the recording mode and the reproducing mode. A change over switch 45 is provided for changing over the heads to be used. Also shown are amplitude detecting circuits 46 and 47, low pass filters 48 and 49 for obtaining DC, a peak hold circuit 50 for holding the peak of the reproduction output, an adder, 51, a differential amplifier 52, a comparator 53, bimorph vibrators 54 and 55 provided with heads, a bimorph driving circuit 56 for displacing the bimorph by an amount corresponding to the output of the differential amplifier circuit 52 by means of the signal from the comparator 53 and that corresponding to the reproduction mode channel, a brightness signal reproducing processing circuit 57, a color signal reproducing processing circuit 58, a 1H delay circuit 59 and a speed control circuit 60 of the same construction as that shown in FIG. 6.

When a magnetic tape registered in azimuth by means of the circuit shown in the drawing is reproduced at the same running speed as at the time of recording, the outputs from the principal heads Ha3 and Hb3 are led to the amplifiers 40 and 41 so as to be amplified up to a proper level, then to the change over switch 45 through the switch circuits 43 and 44 to be changed over in the recording and reproducing modes, and to the brightness reproducing processing circuit 57 and the color signal reproducing processing circuit 58 so as to be converted into the reproducing image signal.

Further, the outputs from the principal heads Ha3 and Hb3 are led to the change over switch 45 and then branched to the amplitude detecting circuit 47 so as to be detected, whereby the maximum value of the envelope is held by means of the peak hold circuit 50 for a comparatively long time.

Further, the output detected by means of the amplitude detecting circuit 47 is converted into DC proportional to the outputs from the principal heads Ha3 and Hb3. Further, the outputs from the auxiliary heads h13 and h23 are also detected by means of the amplitude detecting circuit 46 and converted into DC proportional to the output of the auxiliary heads h13 and h23. The DC voltages proportional to the outputs from the principal heads Ha3 and Hb3, and the auxiliary heads h13 and h23, are added in the adder circuit 51 and then compared with the voltages of the peak hold circuit 50 in the comparator 53 so as to detect the direction of the tracking shift.

Further, the above-mentioned DC voltage corresponding to the outputs of the principal heads Ha3 and Hb3 are led to the one input terminal of the differential amplifier circuit 52, while to the other input terminal the output of the peak hold circuit 53 is delivered so as to obtain the output voltage corresponding to the difference between the both input voltages. This output voltage means corresponds to the amount of the tracking shift. At the time of the ordinary reproduction, by means of the output of the comparator 53 and that of the differential amplifier 52, the bimorph driving circuit 56 controls the bimorph vibrators 54 and 55 in such a manner that the principal heads Ha3 and Hb3 trace the track correctly.

Then, in the still mode, the level of the signal from the mode control signal line ML becomes high, the switch circuits 43 and 44 are changed over to the position shown in broken lines, and the auxiliary head h13 is connected to the image signal reproducing processing circuits 57 and 58, so as to be used for the reproduction of the image. The output of the principal head Ha3 is used only for tracking control. Further, because the level of the signal from the mode control signal line ML is high, the mistracking control systems 46-55 reverse the driving direction of the bimorph relative to that in the ordinary reproduction, in such a manner that the auxiliary head h13 traces the recording track correctly so that it traces the minus azimuth track correctly.

On the other hand, the signal from the principal head Hb3 is led to the 1H delay circuit 59 through the switch circuit 44 so as to carry out a 1H delay. The output of the auxiliary head h13 is matched with that of the principal head Hb3 with reference to time so that a frame reproduction from the same field, the so called "1 field still", is possible.

In the embodiments shown in FIGS. 5, 6 and 7, only the still and the slow reproduction modes are mentioned, however many other variations of the reproduction made at speeds different from that at the time of recording are within the scope of the invention.

As explained above in detail in accordance with the embodiments, at the time of reproduction, the reproducing head of a magnetic recording and reproducing device in accordance with the present invention scans a track in accordance with the curvature of the recording track so as to always obtain a good reproduction signal, which is quite effective when the magnetic recording and reproducing device carries out a high density azimuth recording. Further, in case reproduction is carried out at a speed different from that at the time of recording, a reproduction signal with good quality can be obtained. Further, a head with effective azimuth angle can be chosen, and the quality of the reproduced image in various modes can be improved.

What is claimed is:

1. An apparatus for reproducing video signals recorded on a tape-shaped medium comprising:
    (a) a principal rotation head for reproducing the video signals from a recording track in said tape-shaped medium;
    (b) an auxiliary rotation head movable with said principal rotation head to sense a deviation in position of said principal rotation head from said recording track;
    (c) a video processing circuit for processing the reproduced video signals;
    (d) tracking control means for diminishing said deviation of said principal rotation head by using the reproduction output of said auxiliary rotation head;
    (e) assigning means for selectively operating in a first reproduction mode where signals on said tape-shaped medium are reproduced at a normal speed and a second reproduction mode where signals on said tape-shaped medium are reproduced at a speed different from said normal speed; and
    (f) said assigning means including switching means responsive to selection of said second reproduction mode for connecting the output of said auxiliary rotation head to said video processing circuit.

2. A device in accordance with claim 1, wherein the reproducing means further includes a guide drum for guiding the tape medium.

3. A device in accordance with claim 1, wherein at least two principal rotation heads are provided.

4. A device in accordance with claim 3, wherein the two principal rotation heads are arranged diametrically opposite one another with reference to a center of rotation.

5. A device in accordance with claim 3 or 4, wherein the auxiliary head is provided on one of the principal rotation heads.

6. A device in accordance with claim 3 or 4, wherein one of the principal rotation heads has a plus azimuth angle, and the other principal rotation head has a minus azimuth angle.

7. A device in accordance with claim 6, wherein the auxiliary head is provided at least on one of the principal rotation heads.

8. A device in accordance with claim 7, wherein the auxiliary head provided on one of the principal heads has an azimuth angle contrary to that of the associated principal head.

9. A device in accordance with claim 8, wherein said one of the principal heads is provided with two auxiliary heads each having an azimuth angle which is contrary to that of said one of the principal heads.

10. A device in accordance with claim 1, wherein the auxiliary head is placed at a different position than the principal head in the running direction of the principal head relative to the recording medium.

11. A device in accordance with claim 10, further comprising a time compensation circuit for compensating the time difference between the output of the auxiliary head and that of the principal head.

12. A device in accordance with claim 11, wherein the auxiliary head is positioned behind the principal head in the running direction, and the compensation circuit comprises a delay circuit for delaying the output of the principal head.

13. A device in accordance with claim 1, wherein the adjusting means is an electrical-mechanical connecting member including a piezo element.

14. A device in accordance with claim 1, wherein the reproducing means is constructed and arranged so that the first reproduction mode corresponds to reproducing a motion picture, and the second reproduction mode corresponds to reproducing a still picture when the tape-shaped medium is still relative to the reproducing means.

15. An apparatus in accordance with claim 1, wherein said tracking control means diminishes said deviation by using both the reproduction output of said principal rotation head and the reproduction output of said auxiliary rotation head.

16. An apparatus in accordance with claim 15, wherein said principal rotation head and said auxiliary rotation head are positioned adjacent each other.

17. An apparatus in accordance with claim 16, wherein the two principal rotation heads are arranged diametrically opposite one another with reference to a center of the rotation.

18. An apparatus in accordance with claim 17, wherein said principal rotation heads and said auxiliary head are positioned adjacent each other.

19. An apparatus in accordance with claim 18, wherein one of the principal rotation heads has a plus azimuth angle, and the other principal rotation head has a minus azimuth angle.

20. An apparatus in accordance with claim 19, wherein auxiliary head is provided on at least one of the principal rotation heads.

21. An apparatus in accordance with claim 20, wherein the auxilary head provided close to one of the principal heads has an azimuth angle contrary to that of the associated principal head.

22. An apparatus in accordance with claim 15, wherein at least two principal rotation heads are provided.

* * * * *